L. M. BREW & E. H. REEVES.
SHOCK ABSORBER FOR MOTOR CARS AND OTHER ROAD VEHICLES.
APPLICATION FILED JUNE 6, 1913.
1,086,750.
Patented Feb. 10, 1914.
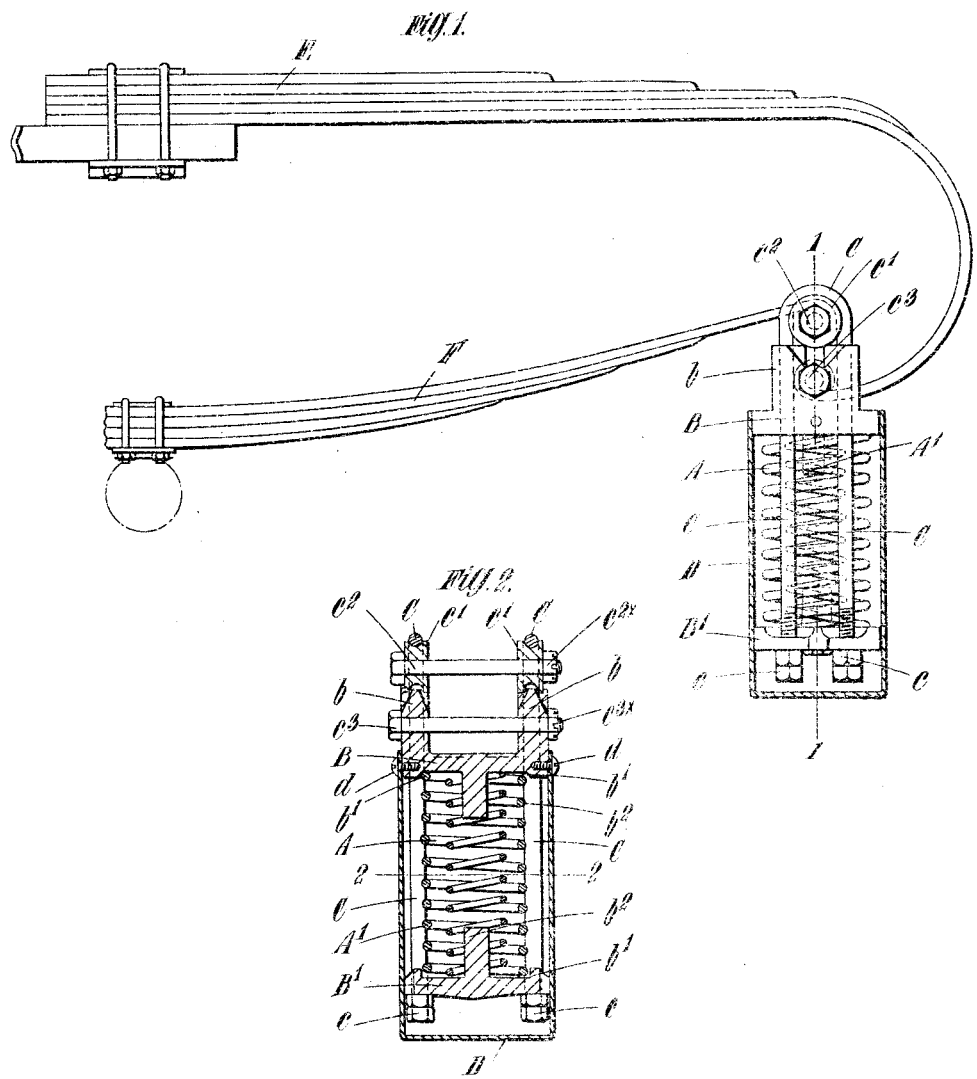
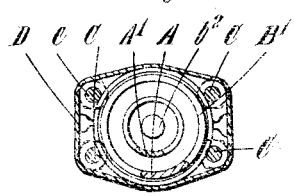

UNITED STATES PATENT OFFICE.

LESLIE MADDOCK BREW AND ERNEST HENRY REEVES, OF HERNE HILL, LONDON, ENGLAND.

SHOCK-ABSORBER FOR MOTOR-CARS AND OTHER ROAD-VEHICLES.

1,086,750.  Specification of Letters Patent.  Patented Feb. 10, 1914.

Application filed June 6, 1913. Serial No. 772,175.

*To all whom it may concern:*

Be it known that we, LESLIE MADDOCK BREW and ERNEST HENRY REEVES, both subjects of the King of Great Britain, residing, respectively, at 330 Kennington road and 34 Deronda road, Herne Hill, both in the county of London, England, have invented certain new and useful Improvements in Shock-Absorbers for Motor-Cars and other Road-Vehicles, of which the following is a specification.

This invention relates to shock absorbers of the kind that are adapted to form a flexible link connection between one end of the axle spring and the chassis of the vehicle and that are provided with inverted U-shaped suspension rods or hangers. The use of these inverted U-shaped rods or hangers is attended with considerable advantages which are too well known to need statement herein, but they do not lend themselves conveniently to shock absorbers in which more than one spring is required to be used without unduly increasing the total diameter of the shock absorber.

It is the chief object of this invention to overcome this drawback by so constructing and arranging the parts of the shock absorber that instead of the inverted U-shaped suspension rods or hangers extending through the springs, they can be so disposed externally with regard thereto.

A further object of the invention is to provide a satisfactory supporting surface for the ends of the springs, without the necessity of using more than a single abutment plate at each end, this object being attained by providing each end plate with an annular circular recess, or an annular rib, and a short central stud or projection.

With these objects in view, our improved shock absorber comprises the combination and arrangement of parts now about to be described, reference being made to the accompanying drawings, in which:—

Figure 1 is an elevation showing our improved shock absorber attached to the axle and chassis springs; in this figure the detachable casing inclosing the springs is shown in section. Fig. 2 is a vertical section of the shock absorber taken on the line 1—1 of Fig. 1 and Fig. 3 is a horizontal section taken on the line 2—2 of Fig. 2.

A A' are the two helical springs arranged vertically one within the other, the outer one being stronger than the inner one, and in the example shown the said springs have opposite convolutions.

B B' are the end plates the upper one B of which is made with elongated lugs or sleeves $b$ $b$ through which pass the suspension rods or hangers C C sufficient play being allowed between these parts to permit the other end plate B to slide freely on the said rods. The aforesaid end plates are formed with circular recesses $b'$ for the reception of the end of the outer spring A and with short studs or projections $b^2$ around which the ends of the inner spring A' are arranged these recesses and studs serving to retain the springs in position vertically. The said suspension rods C comprise four bolts formed by two inverted U-shaped rods or hangers externally arranged with respect to the springs. At their upper ends the hangers pass through the elongated lugs or sleeves $b$ in the upper plate B and at their lower ends they are screw threaded and passed through holes in the lower plate B' to receive retaining nuts $c$. The upper or curved portions of the said hangers are provided with peripherally grooved disks $c'$ the width of the grooves being such as to accommodate the bent portions of the hangers. Each disk $c'$ has a central hole through which passes the bolt $c^2$ which serves to connect the hangers to the axle spring F. The upper end plate is connected to the top spring E of the chassis by a bolt $c^3$ which passes through the aforesaid lugs or sleeves $b$ $b$ and the end of the spring E the said bolts $c^2$ $c^3$ being retained in position by lock nuts $c^{2x}$ $c^{3x}$.

D is the light detachable casing surrounding the springs. This casing is, as aforesaid, made open at the top and closed at the bottom. The said casing is secured to the upper end plate B by the set screws $d$ $d$ which enable it to be readily detached without interfering with any of the other parts.

What we claim and desire to secure by Letters Patent of the United States is:—

1. In a shock absorber, the combination with a casing and a plurality of helical springs of different strengths arranged one within the other, top and bottom plates each having a recess for receiving the ends of the springs, the upper of said plates being provided with elongated upstanding lugs, notches formed in the upper end of said lugs, a bolt connecting oppositely positioned lugs, a plurality of peripherally grooved disks mounted near the ends of the bolt and adapted to register with said notches, and a plurality of inverted U-shaped suspension rods having their inclosed ends engage the groove of the disks and passing through the upper end plate and externally of the springs, into engagement with the lower end plate.

2. A shock absorber comprising a single non-telescopic casing closed at the lower end thereof, two helical springs of different strengths arranged one within the other, the convolutions of said springs being oppositely disposed, a top plate secured to the casing and provided with upwardly extending lugs, and a bottom plate within the casing; each of said plates being provided with a spring-engaging stud for the inner spring, and an annular upstanding flange to engage the outer spring, forming a depressed spring seat adjacent the central stud for both of said members, a plurality of U-shaped suspension rods arranged externally of said springs and on opposite sides thereof, said rods connecting the bottom plate with the axle spring, and means to connect the top plate to the chassis.

In testimony whereof we affix our signatures in presence of two witnesses.

LESLIE MADDOCK BREW.
ERNEST HENRY REEVES.

Witnesses:
L. MELLERSH-JACKSON,
T. SELBY WORDLE.

---

Copies of this patent may be obtained for five cents each, by addressing the "Commissioner of Patents, Washington, D. C."